March 4, 1969  K. B. LARSSON ET AL  3,430,740
RAILWAY VEHICLE WHEEL BRAKE UNIT
Filed Aug. 22, 1967  Sheet 3 of 3

INVENTORS
KARL B. LARSSON
NILS B. L. SANDER
BY Laurence R. Brown
ATTORNEY

# United States Patent Office 3,430,740
Patented Mar. 4, 1969

3,430,740
RAILWAY VEHICLE WHEEL BRAKE UNIT
Karl Bertil Larsson and Nils Börje Lennart Sander, Malmo, Sweden, assignors to Svenska Aktiebolaget Bromsregulator, Malmo, Sweden, a corporation of Sweden
Filed Aug. 22, 1967, Ser. No. 662,446
Claims priority, application Great Britain, Sept. 6, 1966, 39,672/66
U.S. Cl. 188—202      4 Claims
Int. Cl. F16d 65/56

ABSTRACT OF THE DISCLOSURE

An automatic slack adjusting device for railway vehicle brakes operates with an axially movable screw threaded spindle upon which two nuts are mounted for rotation with springs biasing them away from the brake shoe. A sleeve about the spindle moves axially with the brake lever and includes a flange with clutch surfaces engaging both nuts and positioned therebetween. Limit stop means engages the rearmost nut as the brake is released. Clutching and locking means move part of the way with the sleeve over a range of normal slack, and when the slack becomes excessive, the sleeve moves alone and the clutch becomes disengaged to permit the springs to rotate the nuts and take up slack. Thus, operation during wear is automatic and manual nut rotating means is used to readjust the assembly when new brake shoes are installed.

Specification

Figure 1:
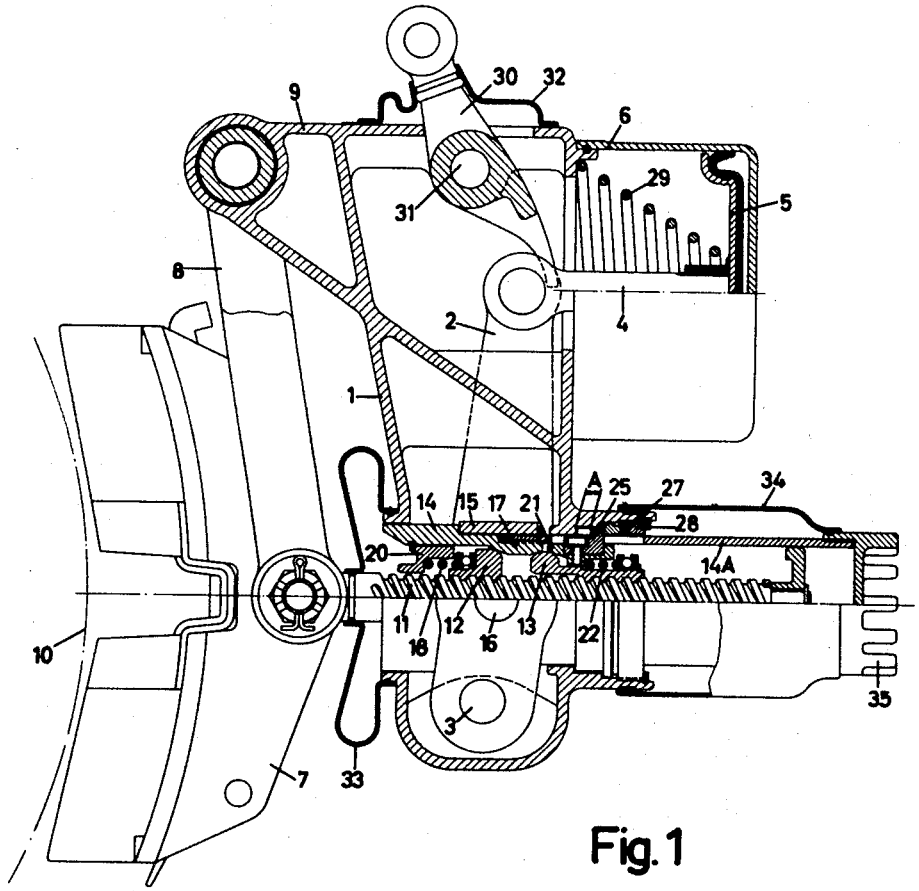

This invention relates to a railway vehicle wheel brake unit of the kind comprising a housing, a brake lever pivotally mounted in the housing, a brake shoe connected to the brake lever, a piston for moving the brake lever to apply the brake to an adjacent vehicle wheel, a return force source for moving the brake lever to release the brake, and an automatic slack adjusting device through which the brake shoe is connected to the brake lever.

While automatic slack adjusting devices for railway vehicle brakes have been known in the prior art, it has been difficult to provide in a single compact unit a slack adjuster which will, at a single braking stroke, make a complete slack adjustment. Consider for example, that a new set of brake shoes need be installed. It is desirable to set the slack adjuster at a maximum slack position and to avoid a tedious manual adjustment of the slack to the proper degree, but this provides little braking for initial service unless the adjuster in a single brake application takes up the entire slack excess.

Also, it is difficult to produce a compact arrangement which gives adequate adjustment range, particularly when required to withstand the vibrations and shocks of railway use without misadjustment.

Accordingly, it is an object of this invention to provide an improved automatic self-adjusting brake unit.

Another object of the invention is to provide a brake unit arrangement for automatically taking up all excessive slack in a single brake application.

Other objects of the invention include the provision of a compact unit with internal slack adjusting mechanisms which retain adjustment during heavy duty railway environment.

Thus, in accordance with this invention a compact brake unit is provided which has a housing affixed to the railway vehicle with a screw threaded spindle type of slack adjusting device mounted therein for axial movement by a brake lever to position a brake shoe coupled to the spindle. Two nuts are mounted for rotation on the spindle and each is spring loaded in a direction away from the brake shoe to thereby tend to freely rotate them on the spindle. A sleeve moved by the brake lever has a flange extending between the two nuts to engage them at clutching surfaces. A locking ring also moves with the sleeve during application of the brakes over that portion of its travel representing normal slack but engages a stop if excessive slack exists so that the sleeve then moves alone. During this portion of sleeve movement the clutch surfaces are disengaged to permit rotation of the nut most remote from the brake shoe by its spring to take up the excessive slack. While in normally released position of the brake, both nuts have clutch surfaces bearing upon the flange on the movable sleeve to hold them in place so that vibration and slack does not cause any maladjustment.

Means is provided for permitting manual adjustment by rotary motion transmitted through the locking ring to that one of said two nuts which is more remote from the brake shoe.

In the accompanying drawings, two brake units in accordance with the invention are illustrated by way of example.

Figure 2:
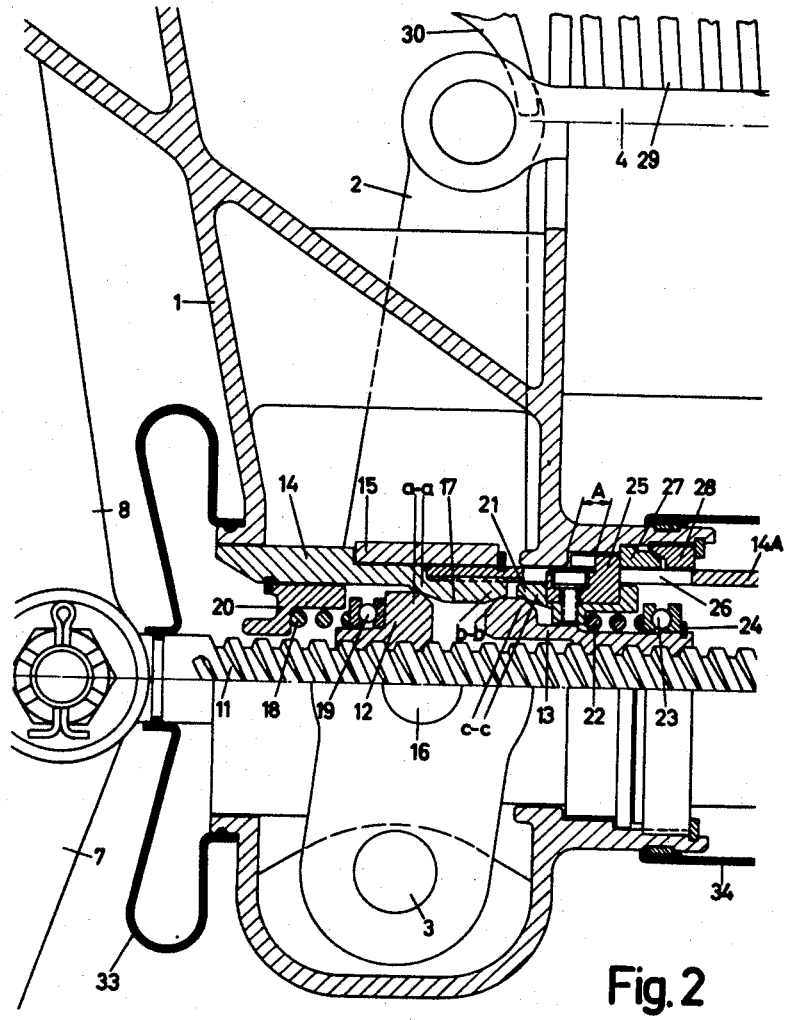
Figure 3:
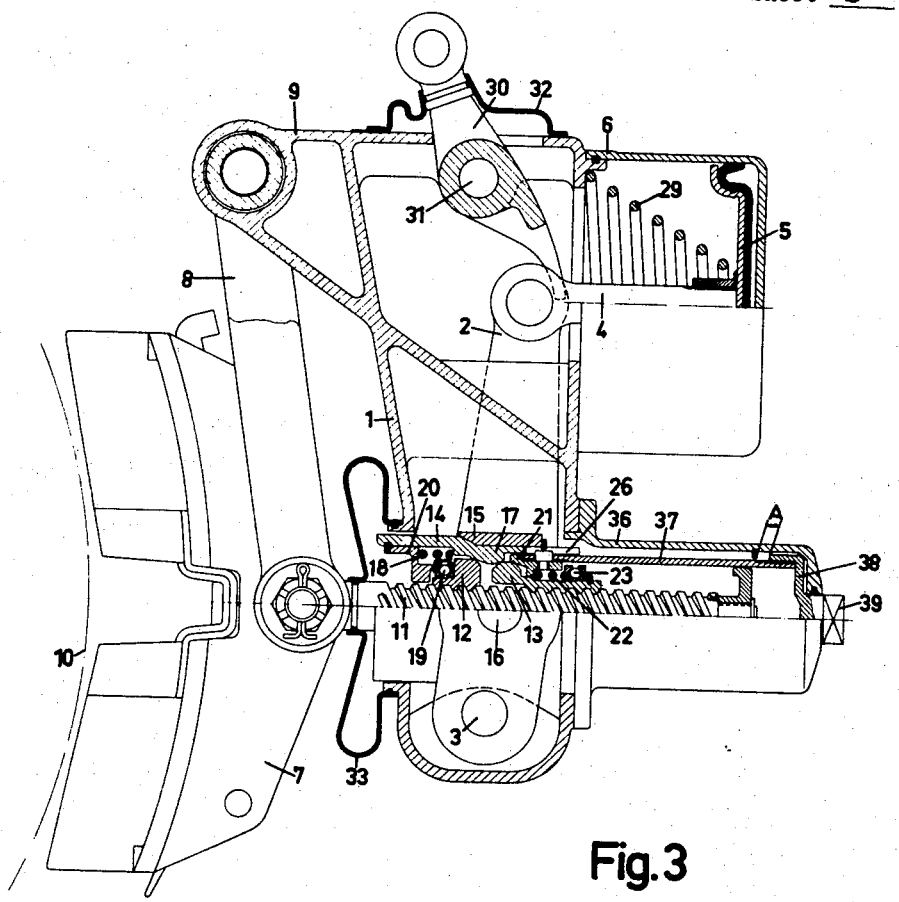

FIGURE 1 is a view partially in vertical section of a first brake unit embodying the invention, FIGURE 2 is a detailed view showing some of the parts of FIGURE 1 to a larger scale, and FIGURE 3 is a view partially in vertical section of a second brake unit embodying the invention.

The two illustrated brake units are shown in the brake-released condition, and each comprises a housing 1, a brake lever 2 pivotally mounted on a pivot pin 3 in the housing 1, a brake shoe 7 coupled through an automatic slack adjusting device to the brake lever 2, a piston 5 for moving the brake lever 2 to apply the brake to an adjacent vehicle wheel 10, and a compression spring 29 acting as a return force source for moving the brake lever 2 to release the brake.

Referring to FIGURES 1 and 2, the housing 1 is adapted to be rigidly secured to a bogie or vehicle frame (not shown). The upper end of the brake lever 2 is pivotally connected to a piston rod 4 rigidly connected to the piston 5 mounted in a cylinder 6 secured to the housing 1. The brake shoe 7 is pivotally connected to an arm 8 which in turn is pivotally connected to a bracket 9 integral with the housing 1. The brake shoe 7 carries blocks adapted to engage the vehicle wheel 10 indicated by the dash-dotted line.

The arm 8 is also pivotally connected to a screw threaded spindle 11 carrying two nuts 12 and 13, the threads of which have such pitch as to be not self-locking. The spindle 11 and the two nuts 12 and 13 are surrounded by a sleeve 14 supported in a collar 15 which in turn is pivotally connected to the brake lever 2 by a pin 16. The sleeve 14 is provided with an inwardly extending flange 17 forming a clutch a—a (FIGURE 2) with the nut 12 which is nearer to the brake shoe 7 and a clutch b—b with the nut 13 which is more remote from the brake shoe 7.

The nut 12 is urged toward the flange 17 by a compression spring 18 bearing upon a ball-bearing 19 mounted on the nut 12 and open a spring support 20 mounted inside the sleeve 14. The nut 13 is urged rightwards towards the left-hand side of a locking ring 21 surrounding the nut 13—thus forming a clutch c—c—biased by a compression spring 22 acting upon an internal shoulder of the locking ring 21 and upon a ball-bearing 23 which in turn engages a spring clip ring 24 on the nut 13. The locking ring 21 is secured to a spider sleeve 25 with radial projections guided in corresponding axially extending slots 26 in a tube 14A secured to the sleeve 14. The projections of the spider sleeve 25 also extend into slots in a rotatable clutch ring 27 which in turn bears against a fixed clutch ring 28 rigidly secured to the housing 1.

The piston-return compression spring 29 urges the piston 5 towards the right, but the piston 5 and lever 2 are prevented from further movement by the flange 17 engaging the nut 13, which in turn engages the locking ring 21, transmitting the force through the spider ring 25 to the clutch ring 27 and the fixed clutch ring 28.

A lever 30 pivoted by a pin 31 to the housing 1 is adapted to be connected to a conventional hand brake.

Flexible covers 32, 33, and 34, for example, of plastic material or rubber, are fitted to prevent entrance of dirt into the housing 1.

The tube 14A is provided with a cap having fingers 35 for engagement with a tool when effecting manual rotation of the sleeve 14.

The operation of the brake unit shown in FIGURES 1 and 2 is as follows:

The various elements are shown in their released brake positions.

Upon braking the piston rod 4 is displaced towards the left and the brake lever 2 is turned counterclockwise, causing a substantially rectilinear axial movement towards the left of the sleeve 14. Sufficient play allowing for the small differences between a rectilinear and a curved path is present between the collar 15 and the sleeve 14 and between the sleeve 14 and the guiding parts of the housing 1.

The brake force is transmitted via the collar 15, the sleeve 14, the flange 17, clutch a—a, the nut 12, and the spindle 11 to the brake shoe 7.

Thus, during normal braking with normal slack all slack-adjusting parts 11 to 25 remain in their relative positions shown, and likewise during the release of the brake the said parts will remain in their relative positions shown.

If the slack between the wheel 10 and the brake blocks on the shoe 7 has become too large, then during the next application of the brake the distance A between the spider sleeve 25 and the adjacent parts of the housing 1 in the axial direction is absorbed prior to obtaining the normal maximum piston stroke, that is to say the leftward axial movement of the locking ring 21 is limited and terminated by the spider ring 25 coming into abutment against a surface of the housing 1 while the sleeve 14 and brake lever 2 can continue to move due to force from the piston 5. During further leftward travel of the piston 5 the spider sleeve 25 and the locking ring 21 will remain stationary, and the clutches b—b and c—c will become disengaged as the sleeve 14 with internal flange 17 and nut 12 and spindle 11 continue to move towards the left. However, due to the force exerted by the spring 22 the nut 13 will start rotating on the spindle 11 until the clutch c—c is engaged again. However, the axial distance between the surfaces of the clutch b—b will increase, and when the braking has reached its final stage this axial distance will represent the amount by which the slack in the brake should be adjusted which is the requisite displacement of the spindle 11 relative to the sleeve 14.

During the initial stage of the following brake release operation the transmitted brake force together with the force of the spring 18 is sufficient for keeping the clutch a—a engaged and all slack adjusting parts 11 to 25 will perform a simple transversal movement towards the right without relative movements. However, as soon as the braking force has become so small that the force of the return spring 29 is necessary in order to continue a clockwise movement of the brake lever 2 (the force of the spring 18 being without substantial importance), the clutch a—a will open and the nut 12 will start spinning while being axially displaced on the spindle 11 towards the right. This movement of the nut 12 will continue until the nut 12 engages the flange 17 at a—a dependent upon the axial movement of the sleeve 14 and flange 17, which is terminated by the flange 17 engaging the nut 13 at the clutch b—b when the nut 13 is engaged with the locking ring 21 at c—c and the locking ring 21 and spider ring 25 are back in the illustrated positions.

As a result the spindle 11 has been moved axially leftward relative to the sleeve 14 by a distance corresponding to the formerly existing excessive slack.

It will be observed that the piston return spring 29 functions as a locking spring for engagement of the clutches b—b and c—c, the force of engagement being multipled corresponding to the leverage of the brake lever 2.

By manually turning the fingers 35 the sleeve 14, the spider sleeve 25, the clutch ring 27 and the two nuts 12 and 13 may be rotated, thus causing an axial movement of the spindle 11. Such manual adjustment is necessary in the slack increasing direction when new blocks are fitted to the shoe 7 to replace worn-out blocks. However, no manual adjustment of the slack is required after a replacement of a brake block, as the slack is immediately and automatically adjusted after a single testing application and release of the brakes.

The brake unit illustrated in FIGURE 3 is similar in many respects to that illustrated in FIGURES 1 and 2, and like reference numerals indicate like parts, but the brake unit shown in FIGURE 3 differs from that illustrated in FIGURES 1 and 2 in that the housing 1 has been provided with a protruding rigid closed cylinder element 36. Furthermore, the locking ring 21 is rigidly fixed to an axially movable and rotatable sleeve 37 provided with a cover 38 at the end remote from the ring 21. The said cover 38 is provided with a square head 39 passed through the closed end of the cylinder element 36 and adapted to be engaged by a wrench. The cover 38 is adapted to engage a conical clutch surface inside the closed end of the cylinder element 36 to terminate and limit axial movement of the sleeve 37 and locking ring 21 towards the right. Axial movement of the sleeve 37 and locking ring 21 towards the left (during application of the brakes) is limited and terminated by the cap 38 coming into abutment against a split ring fixed in an annular groove inside the element 36, the possible axial movement being indicated by the dimension A.

The brake unit shown in FIGURE 3 functions in substantially the same way as that shown in FIGURES 1 and 2. However, the unit shown in FIGURE 3 is somewhat easier to manufacture and may have somewhat smaller outer dimensions. The force of the return spring 29 is transmitted via the piston rod 4, lever 2, collar 15, sleeve 14, flange 17, nut 13, locking ring 21, sleeve 37, cover 38, and cylinder element 36 to housing 1.

Naturally, the invention may be applied to brakes of the type in which the piston is activated by a spring force source and returned by compressed air.

What is claimed is:

1. A railway vehicle wheel brake device comprising in combination, an axially movable screw threaded spindle, a brake shoe coupled to one end of the spindle, two nuts mounted for rotation on the spindle, spring means biasing each nut in the direction away from the brake shoe, a brake lever, a sleeve pivotally coupled to the brake lever for movement therewith and surrounding the spindle including an internal flange positioned between the two nuts and extending into position for engaging both nuts at opposite ends, locking means engaging that one of said two nuts which is more remote from the brake shoe to limit movement of the brake shoe, means moving the locking means with said sleeve axially of said spindle with the brake lever movement including means restricting the movement of the locking means over a range of movement smaller than that of said sleeve, the latter means being constructed to proportion relative ranges of movement so that both the sleeve and locking means move in unison over a movement range representing normal slack and the sleeve continues to move alone when excessive slack becomes greater than normal, and clutch means including said flange disengageable when said sleeve moves alone thereby permitting said nuts to rotate until the excessive slack is taken up.

2. A device as defined in claim 1, including rotatable means coupled to said nut more remote from the brake shoe by locking means to adjust the position of the nut.

3. A device as designed in claim 1, wherein the unit is mounted on a housing attached to a railway vehicle, and the clutch means includes a surface fixed relative to said housing engaging the locking means at a limiting position in the direction away from the brake shoe.

4. A device as defined in claim 3, wherein the housing includes an element surrounding the movable sleeve, said element includes a surface of said clutch means to terminate and limit the axial movement of the sleeve, and said element further includes the means restricting the movement of the locking means over a range of movement smaller than that of the sleeve.

References Cited

UNITED STATES PATENTS

| | | | |
|---|---|---|---|
| 3,043,406 | 7/1962 | Larsson | 188—203 X |
| 3,280,945 | 10/1966 | Spalding | 188—202 |

DUANE A. REGER, *Primary Examiner.*